United States Patent Office 3,591,661
Patented July 6, 1971

3,591,661
POLYMERIC PHOTOSENSITIZERS
Fulton Floyd Rogers, Jr., Richmond, Va., assignor to E. I. du Pont de Nemours and Company, Wilmington, Del.
No Drawing. Filed July 23, 1969, Ser. No. 844,171
Int. Cl. C08f *37/18*
U.S. Cl. 260—897  2 Claims

ABSTRACT OF THE DISCLOSURE

Improved copolymeric photosensitizers comprising alpha olefin and acryloxyalkyl and methacryloxyalkyl substituted anthraquinones, useful for crosslinking polymers.

BACKGROUND OF THE INVENTION

Polymeric materials, including polyethylene, polypropylene and polymers prepared from polar vinylidene monomers are widely used for a variety of industrial applications. These materials, however, commonly suffer from various deficiencies including inadequate dimensional stability and resistance to permanent stress deformation, as well as low resistance to grease, oil and organic solvents.

It is known that many of these deficiencies can be cured or substantially improved by photocrosslinking. Such crosslinking can be facilitated by the use of photosensitizers such as homopolymers and copolymers of acryloxybenzophenone, as described in U.S. Pats. 3,214,492, 3,265,-772 and 3,315,013.

In the use of such sensitizers, however, still another difficulty has emerged. It is observed that upon radiation of polymer blends to achieve either crosslinking or grafting, the degree of crosslinking throughout the treated article may be ununiform. It is believed that the polymeric sensitizers described in the patents referred to above undergo rearrangement to form a chelated structure which is an effective ultraviolet light absorber. Consequently, in relatively thick polymeric structures, the external portions of the structure may be transformed into a light absorbing moiety, and thereby screen subsequent radiation. Thus, in thicker structures, crosslinking of interior portions may be prevented, and in thinner structures, irradiation and the resulting crosslinking may take place at a substantially lower rate than would be desirable.

SUMMARY OF THE INVENTION

The instant invention provides photosensitizers for photocrosslinking of polymeric materials which overcome the disadvantages heretofore encountered.

Specifically, the instant invention provides light sensitizing copolymers of alpha olefin having from 2 to 4 carbon atoms and about from 0.01 to 10 mole percent of monomer having the structural formula:

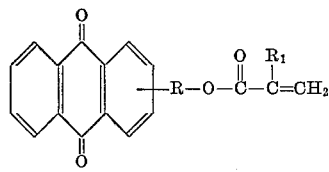

wherein R is an alkylene group having 1 to 4 carbon atoms and $R_1$ is selected from hydrogen and methyl.

These copolymers, in addition to providing desirable formed structures by themselves, are particularly useful in the crosslinking of polyethylene and polypropylene, and there is accordingly also provided a crosslinked polymeric composition comprising a blend of the above copolymer and an alpha olefin selected from polyethylene and polypropylene wherein the copolymer comprises at least about from 0.1% of the blend.

The invention still further provides a crosslinked polymeric composition comprising a blend of a polymer of at least one polar vinylidene monomer having the formula

wherein $R^2$ is selected from one of the following groups:

—Cl, —Br, —F, —CHO, —CN, —$C_6H_5$

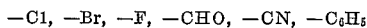

and

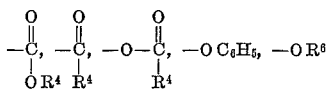

wherein $R^4$ and $R^5$ are each selected from the group consisting of alkyl and —H, $R^6$ is alkyl; and
wherein $R^3$ is selected from the group consisting of $R^2$, —H and alkyl of 1 to 4 carbon atoms;
and at least 0.1 mole percent of the copolymer defined above.

There is also provided in accordance with the instant invention a process for crosslinking and grafting polymers which comprises intimately blending the polymeric photosensitizers and the polymer to be crosslinked and thereafter exposing the blend to radiation having a wavelength of about from 2,000 to 7,000 A.

DESCRIPTION OF THE PREFERRED EMBODIMENTS

The polymeric photosensitizers of the instant invention can be prepared by reaction of an anthraquinone derivative containing an active hydrogen atom with an olefin-carboxylic acid halide copolymer following the general procedures described in U.S. Pat. 3,441,545, hereby incorporated by reference. Particularly suitable active hydrogen groups which will react with the acid halide groups of the olefin-carboxylic acid halide copolymers include alcoholic hydroxyl groups, amino groups containing at least one hydrogen bonded to nitrogen, enolizable carbon hydrogen groups, mercapto groups, thiocarboxylic acid groups and phosphino groups. Preferred derivatives are those with an alcoholic hydroxyl.

Acid copolymers which can be used for conversion to acid halide copolymers for making the desired polymers of this invention include copolymers of ethylene with acrylic acid, methacrylic acid, itaconic acid or maleic acid and combinations of these acids. Of those, copolymers of ethylene with acrylic and methacrylic acids are particularly preferred.

The photosensitizing copolymers of the instant invention can be used as such to form shaped articles or they may be used in blends with other polymers, including polymers of alpha-olefins such as polyethylene and polypropylene and polymers of the polar vinylidene monomers described above. The blends should contain at least 0.1 percent by weight based on the weight of the blend, preferably 5–50 percent of the photosensitizing copolymer, and the substituted anthraquinone units must represent at least 0.01 mole percent, preferably 0.1–10 mole percent of the blend. Less than 0.01 percent of the stabilizer does not provide sites for cross-linking or grafting in the subsequent radiation step, and more than 10 mole percent does not provide sufficient improvement to warrant the use of the relatively expensive sensitizing homopolymer. Blending of the copolymers of the invention with other polymers can be accomplished by any of the conventional methods, e.g. rubber milling and agitating in a liquid medium.

The copolymers and polymer blends of the instant invention can be formed into various shaped articles such as self-supporting films, laminates, coatings, filaments and tubing. The shaped article is then exposed to radiation having a wavelength of 2,000–7,000 A., preferably ultraviolet radiation of 2,000–4,000 A., for a period of time sufficient to produce crosslinking, such period being at least 0.1 second under high energy xenon radiation but usually from 5 seconds to about 30 minutes under conventional radiation means, e.g. sunlamps, sunlight and the like.

After irradiation, besides exhibiting increased strength, the shaped articles of the invention display increased modulus (stiffness), improved resistance to grease and oil, increased resistance to stress-cracking and an improvement in their high temperature properties. The shaped articles, particularly the self-supporting films, find utility in packaging applications where high oil and grease resistance is required, i.e. containers for potato chips, bacon rind, etc. The shaped articles of the invention are also useful in industrial construction; for example, as protective sheeting that is resistant to "creep." Sheets containing the copolymers that had been exposed to radiation are also useful in photoreproduction processes.

In the following examples, which further illustrate the instant invention, parts and percentages are by weight. In these examples, Melt Index is determined according to ASTM–D–1238 and dynamic zero strength temperature is determined according to ASTM–D–1430.

EXAMPLE 1

Part A—Preparation of 2-bromomethylanthraquinone

Into a reaction vessel filled with a mechanical stirrer and distillation head there are placed 125 parts of 2-methylanthraquinone, 100 parts of N-bromosuccinimide, 1.25 parts of benzoyl peroxide and 3685 parts of reagent grade carbon tetrachloride. The reaction mixture is brought to reflux with stirring and about 475 parts of solvent is distilled from the mixture. The mixture is further heated at reflux for 40 hours after which it is cooled and the product which separates is filtered, dried, extracted with water at 70° C., and again dried. This material is recrystallized from acetic acid to yield 51 parts of the desired product with melting point of 198–201° C. This is used in the preparation of 2-acetoxymethylanthraquinone described below.

Part B—Preparation of 2-acetoxymethylanthraquinone

A mixture of 50 parts of 2-bromomethylanthraquinone, 87 parts of sodium acetate in 790 parts of acetic acid is heated at reflux for 12 hours, cooled and the solid material which separates is washed with warm water to yield 31 parts of product, identified as the title compound, melting in the range of 144–149° C.

Part C—Preparation of 2-hydroxymethylanthraquinone

A mixture of 5 parts of 2-acetoxymethylanthraquinone and 120 parts of ethanol is heated in a steam bath to partial solution followed by addition of 40 parts of concentrated hydrochloric acid and further heating for about 15 minutes to effect complete solution. After an added 30 minute period of refluxing, the solution is cooled, and the solid product which forms is filtered and dried. There is obtained 3.15 parts of product having a melting point of 190–190.5° C., which is identified as 2-hydroxymethylanthraquinone.

Part D—Synthesis of copolymer

Twenty-five parts of an ethylene-methacrylic acid copolymer having a melt index of 4.9 and containing 3% methacrylic acid is reacted with excess thionyl chloride in Perclene solvent at 80° C. for 3 hours. The resulting ethylene methacrylyl chloride, together with a molar equivalent of 2 - hydroxymethylanthraquinone, is dissolved in excess tetrachloroethylene. The solution is heated at reflux for 70 hours. Excess isopropanol is added to quench any unreacted acid chloride, after which the reaction mixture is heated at reflux for an additional 18 hours. The product, isolated by precipitation with additional isopropanol, is a creamy white powder which is identified as 2-methacryloxymethylanthraquinone/ethylene copolymer.

EXAMPLE 2

The copolymer prepared in Example 1 is pressed into a self-supporting film and subjected to irradiation by a 1000-watt lamp for a period of 30 seconds. The irradiated film exhibits increased resistance to grease and oil as well as increased dimensional stability, indicating that crosslinking has taken place.

EXAMPLE 3

A film of a blend of the copolymer prepared in Example 1 and polypropylene is prepared by repeated pressing of the sample at 190° C. The amount of anthraquinone moiety in the finished film comprises 0.6% by weight. The film sample is exposed to a medium pressure mercury ultraviolet lamp for 20 seconds. The zero strength temperature of the irradiated film is 226° C. compared to 186° C. for the unexposed sample.

EXAMPLE 4

Two polyethylene [1] film samples are prepared. Sample A contains the ethylene/methacryloxymethylanthraquinone copolymer of this invention and Sample B, a control sample, contains an equal percentage of the ethylene/acryloxybenzophenone photosensitizing copolymer described in U.S. Pat. 3,214,492. The two samples are exposed simultaneously to the radiation from a medium pressure mercury lamp. After 2 seconds exposure of the Sample A, a zero strength temperature of 173° C. is measured. After 4 seconds exposure of the Sample B, a zero strength temperature of 140° C. is measured. After exposure for approximately 10 seconds, both Sample A and Sample B exhibit a zero strength temperature of about 230° C. Thus, in the early stages of the irradiation, the photosensitizer of the instant invention appears to promote crosslinking about twice as rapidly as that in Sample B.

I claim:
1. A crosslinked polymeric composition comprising a blend of
   (A) an alpha olefin selected from polyethylene and polypropylene, and
   (B) at least about 0.1% of a copolymer consisting essentially of alpha olefin having from 2 to 4 carbon atoms and about from 0.01 to 10 mole percent of substituted anthraquinone having the structural formula

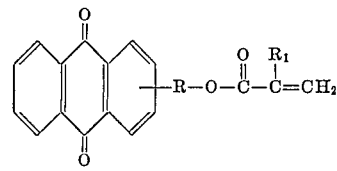

where R is an alkylene group having 1 to 4 carbon atoms and $R_1$ is selected from hydrogen and methyl.

2. A crosslinked polymeric composition comprising a blend of

---

[1] "Alathon 15," commercially available from E.I. du Pont de Nemours and Company.

(A) a polymer of at least one polar vinylidene monomer having the formula

where $R^3$ is selected from one of the following groups:

—Cl, —Br, —F, —CHO, —CN, —$C_6H_5$

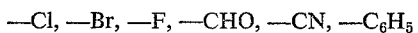

and

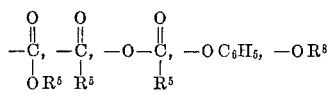

wherein
$R^5$ and $R^6$ are each selected from the group consisting of alkyl and —H, $R^8$ is alkyl; and
wherein
$R^4$ is selected from the group consisting of $R^3$, —H and alkyl of 1 to 4 carbon atoms; and
(B) at least about 0.1% of a copolymer consisting essentially of alpha olefin having from 2 to 4 carbon atoms and about from 0.01 to 10 mole percent of substituted anthraquinone having the structural formula

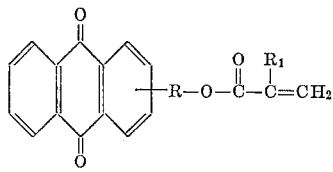

where R is an alkylene group having 1 to 4 carbon atoms and $R_1$ is selected from hydrogen and methyl.

References Cited
UNITED STATES PATENTS 3,214,492  10/1965  Tocker.
3,265,772  8/1966   Tocker.
3,315,013  5/1967   Tocker.

MURRAY TILLMAN, Primary Examiner

C. J. SECCURO, Assistant Examiner

U.S. Cl. X.R.

204—159.2; 260—63